(12) United States Patent
Bousquet et al.

(10) Patent No.: US 6,650,906 B1
(45) Date of Patent: Nov. 18, 2003

(54) METHOD OF CONTROLLING POWER IN A TRANSMISSION LINK BETWEEN A TRANSMITTER AND A RECEIVER IN A POINT TO MULTI-POINT COMMUNICATION NETWORK AND SYSTEM FOR CARRYING OUT SAID METHOD

(75) Inventors: Jacques Bousquet, Croissy sur Seine (FR); Bertrand Duros, Asnieres (FR); Hervé Radureau, Nanterre Cedex (FR)

(73) Assignee: Alcatel, Paris (FR)

( * ) Notice: Subject to any disclaimer, the term of this patent is extended or adjusted under 35 U.S.C. 154(b) by 516 days.

(21) Appl. No.: 09/659,606

(22) Filed: Sep. 11, 2000

(30) Foreign Application Priority Data

Sep. 16, 1999 (EP) .............................. 99402269

(51) Int. Cl.⁷ .............................. H04B 7/00; H04Q 7/20
(52) U.S. Cl. ......................... 455/522; 455/69; 370/318
(58) Field of Search ............................ 455/69, 522, 24, 455/67.3, 68, 70, 13.4, 62, 67.1; 370/318, 333, 332

(56) References Cited

U.S. PATENT DOCUMENTS

| | | | | |
|---|---|---|---|---|
| 5,978,657 A | * | 11/1999 | Suzuki | 455/522 |
| 6,212,397 B1 | * | 4/2001 | Langston et al. | 455/500 |
| 6,253,077 B1 | * | 6/2001 | Burt et al. | 455/424 |
| 6,285,886 B1 | * | 9/2001 | Kamel et al. | 455/522 |
| 6,408,165 B1 | * | 6/2002 | Raissinia et al. | 455/69 |

* cited by examiner

Primary Examiner—Edward F. Urban
Assistant Examiner—Simon Nguyen
(74) Attorney, Agent, or Firm—Sughrue Mion, PLLC

(57) ABSTRACT

A method of controlling power in a transmission link between a central station and a terminal in a point to multi-point communication network and system for carrying out the method, particularly suitable for implementation in satellite access networks or terrestrial point to multi-point access networks. A transmitter transmits a plurality of reference signals (4) to a plurality of receivers (2); each receiver (2) measures the respective quality of the signals so as to determine a reference signal (4) corresponding to the receiver (2); each receiver (2) indicates to the transmitter (1) the reference signal (4) corresponding thereto; and if required, the transmitter (1) adjusts the power level of transmission of the traffic data (3).

9 Claims, 1 Drawing Sheet

METHOD OF CONTROLLING POWER IN A TRANSMISSION LINK BETWEEN A TRANSMITTER AND A RECEIVER IN A POINT TO MULTI-POINT COMMUNICATION NETWORK AND SYSTEM FOR CARRYING OUT SAID METHOD

The present invention relates to a method of controlling power in a transmission link between a central station and a terminal in a point to multi-point communication network and system for carrying out said method. The present invention is suitable for implementation in satellite access networks or terrestrial point to multi-point access networks.

Particularly the invention relates to controlling power in communication between a transmitter such as a central station and terminals receiving such communication, which permit the compensation of power loss caused by the diverse phenomena present on the way of the signal propagation.

BACKGROUND OF THE INVENTION

As it is well known in the field of telecommunications, when a signal is transmitted from a transmitter station via radio to a receiver station, different phenomena present on its propagation path may affect the quality of the signal received at the receiver end.

One example of such phenomena may be obstacles present on the propagation path of the signal which cause the signal to be reflected from them and thus give rise to signals traveling on various paths, or the so called multi-path signals. An important negative consequence caused by the presence of multi-path signals is the effect known as fading in which signals transmitted through different paths are received in different phases and therefore tend to cancel each other in amplitude.

Rain, storm or other similar natural disturbances are further examples of phenomena giving rise to signal deterioration. A further effect in power loss variation could be caused by the distance variation from the base station, or from the terminal to the satellite when the terminal and/or the satellite are moving. It is known that the larger said distance is, the higher the power loss would be in the signal. Overcoming these effects in conventional manners would require costly solutions and limits the resources of the whole system. A widely used known solution consists of adjusting the power, link by link, or connection by connection. The terminal station performs in a continuous manner a measurement of the quality of the data received. Said measurement is then communicated to the central station. The central station would then adjust the power of transmission depending upon the information received from the terminal.

The above solution has the drawback that when traffic links transmit the data in a sporadic manner—which is a situation which may occur for example in Internet traffic, voice transmission using silence intervals, or the like—it may happen that a traffic link remains inactive during a relatively long period of time due to the presence of the aforementioned transmission phenomena, thus making said measurement impossible or inaccurate. A solution to this problem may consist of forcing a cyclic emission in the central station during said silence periods; however this approach would cause loss of resources in the transmission system.

According to another known solution the terminal performs a quality calibration over the signal broadcast from the central station. An example of calibration could consist of measuring the bit error rate of the signal to noise ratio. However if the dynamic of the power control is important, it could turn out to be difficult, or even impossible to determine with good accuracy, the quality of the received signal when the its level is too high. This situation may occur when a reference signal is emitted at strong levels so that it can be received by all the terminals, including under unfavorable propagation conditions.

Therefore it is desired to compensate the effects caused by the phenomena present on the transmission path of the signal, while at the same time the use of the resources of the transmission system is optimized. In order to obtain the desired solution it would be necessary to control the transmission power.

DESCRIPTION OF THE INVENTION

In order to overcome the above disadvantages, the method of controlling power in a transmission link between a transmitter and a receiver in a point to multi-point communication network and system for carrying out said method are proposed by the present invention.

One object of the present invention is that of providing a method comprising the steps of:

at least one transmitter means periodically transmitting a plurality of reference signals to a plurality of receiver means; each reference signal having a quality corresponding to at least one receiver means;

each receiver means receiving said plurality of reference signals and measuring their respective quality so as to determine the reference signal corresponding to said receiver means;

each receiver means indicating to said at least one transmitter means, the reference signal corresponding thereto; and if the indication received from said receiver means so requires, said at least one transmitter means adjusting the power level of transmission.

According to the invention, said quality of each reference signal is expressed in terms of signal to noise ratio or other known means.

The indication of the reference signal corresponding to the receiver means is made by transmitting a return signal from the receiver means to the transmitter means.

Further, in order to increase the accuracy and to limit the number of transmitted signals, the return signal indicated by the receiver means to the transmitter means ma be computed from the received reference signals.

Another object of the present invention is that of providing a transmitter means adapted for periodically transmitting a plurality of reference signals to a plurality of receiver means, each reference signal having a transmission quality corresponding to at least one receiver means; and for receiving signals transmitted from at least one receiver means, said signals being indicative of a reference signal corresponding to said receiver means.

The above and further embodiments of the present invention are described in further detail hereinbelow as well as in the claims.

DESCRIPTION OF A PREFERRED EMBODIMENT

Figure 1:
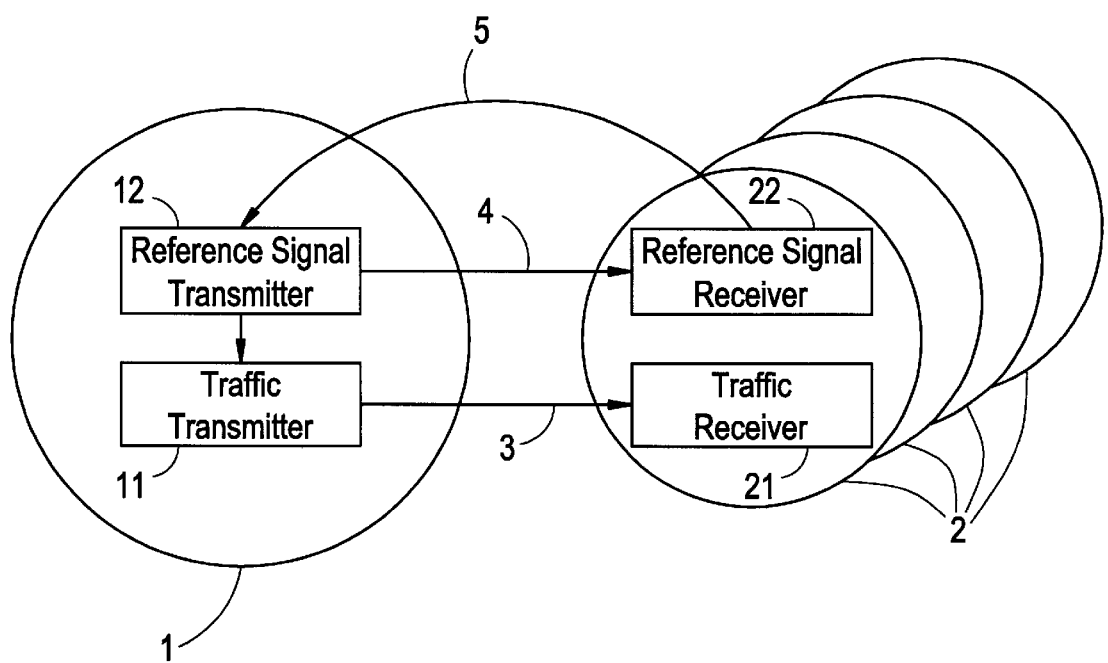
FIG. 1 is a schematic diagram of a communication network system for carrying out the method of the present invention.

Referring to FIG. 1, there is provided a communication network comprising at least one transmitter means 1 such as a central station, and a plurality of terminal stations comprising receiver means 2 such as a fixed or mobile termination. Each transmitter means 1 comprises, inter alia, traffic transmitter means 11 and reference signal transmitter means 12. Each receiver means 2 comprises, inter alia, traffic receiver means 21 and reference signal receiver means 22.

With the above arrangement taken as a non-limiting example of the invention, a transmitter means 1 is described capable of transmitting traffic data 3 from a traffic transmitter means 11 included therein, to a plurality of receiver means 2, either mobile or fixed, said transmission having a power level which is at a minimum level, but sufficient for ensuring that the quality of the service required is guaranteed, such quality being expressed in known manners such as in terms of signal to noise ratio or other known means. Additionally the reference signal transmitter 12 of the transmitter means 1, transmits a signal, as a reference signal 4 which serves as a scale for controlling the quality (power level) of the traffic data being transmitted. Said reference signal 4 is transmitted in any convenient manner such as periodically, continuously, or even randomly, from said transmitter 1, and is received at the reference signal receiver means 22 of the receiver means 2. In practice, the transmitter means transmits a plurality of said reference signals 4, corresponding to a plurality of receiver means 2.

Once the reference signals are received at a receiver end 2, the power level of said signals 4 are measured by the reference signal receiver means 22. As this measurement is made over a plurality of reference signals, it thus permits each terminal to determine its corresponding reference signal 4. Having determined said corresponding reference signal 4, the receiver means 2 then transmits a return signal 5 to the transmitter means 1, indicating the reference signal 4 corresponding to that particular terminal. The transmitter means 1 in turn, adjusts, if required, the corresponding power level of the signal in the following manner. When the reference signal transmitter 12 receives said return signal 5, it sends an indication to the traffic transmitter means 11 which in turn performs the adjustment in the transmission power level.

At the receiving side, each receiver means 2 can send the return signal 5 to the transmitter means 1, periodically and/or upon a change produced in the quality of the received signal 4. Using this information, the transmitter 1 can then adjust the level of the power of transmission towards each terminal, having regard to the quality of the service provided in each connection. It is to be noted that the traffic data 3 transmitted by the transmitter 1 to different terminals, i.e. receiver means, are also received by other terminals. Therefore, said traffic data 3 as such may also be used totally or partly as reference signals.

What is claimed is:

1. A method of controlling power in a transmission link between a transmitter and a receiver in a point to multi-point communication network, said network comprising at least one transmitter transmitting traffic data to a plurality of receivers, characterized in comprising the steps of:

said transmitter transmitting a plurality of reference signals to said plurality of receivers; each reference signal having a quality corresponding to at least one receiver;

each receiver receiving said plurality of reference signals and measuring their respective quality so as to determine a reference signal corresponding to said receiver;

each receiver indicating to said at least one transmitter, the reference signal corresponding thereto; and if the indication received from said receiver so requires;

said at least one transmitter adjusting the power level of transmission of said traffic data.

2. A method according to claim 1, characterized in that said quality of each reference signal is expressed in terms of signal to noise ration.

3. A method according to claim 1, characterized in that the indication of the reference signal corresponding to the receiver is made by transmitting a return signal from the receiver to the transmitter.

4. A method according to claim 3, characterized in that the return signal is determined from the received reference signals.

5. A method according to claim 1, characterized in that, said traffic data is used totally or partly as reference signals.

6. A transmitter means for use in a transmission link in a point to multipoint communication network, said network further comprising a plurality of receivers, characterized in that said transmitter is adapted for transmitting a plurality of reference signals to said plurality of receivers, each reference signal having a transmission quality corresponding to said at least one receiver; and for receiving signals transmitted from at least one receiver, said signals being indicative of a reference signal corresponding to said receiver.

7. A transmitter means according to claim 6, characterized in that said quality of each reference signal is expressed in terms of signal to noise ratio.

8. A central station, including the transmitter of claim 6.

9. A receiver for use in a transmission link in a point to multipoint communication network, said network further comprising at least one transmitter for transmitting traffic data, characterized in that said receiver is adapted for receiving a plurality of reference signals from said at least one transmitter, at least one of said reference signals having a transmission quality corresponding to said receiver; and for transmitting signals from said receiver to said at least one transmitter, said signals being indicative of said reference signal corresponding to said receiver.

* * * * *